United States Patent
Matsui et al.

(10) Patent No.: US 6,798,085 B1
(45) Date of Patent: Sep. 28, 2004

(54) POSITION DETECTION DEVICE (75) Inventors: Seika Matsui, Chiryu (JP); Toshiro Maeda, Anjyo (JP); Tatsumi Tashiro, Toyota (JP); Shinji Suganuma, Toyota (JP); Junkoh Shima, Nisshin (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 183 days.

(21) Appl. No.: 09/686,989

(22) Filed: Oct. 17, 2000

(30) Foreign Application Priority Data

Oct. 19, 1999 (JP) .......................................... 11/297425

(51) Int. Cl.$^7$ .............................................. H02H 13/00
(52) U.S. Cl. ..................................... 307/112; 307/10.1
(58) Field of Search ................................. 307/112, 115, 307/119, 10.1; 200/19 R, 30 R, 61.71; 318/467, 468, 466, 266, 282; 296/76, 107.08, 117, 136, 219, 223

(56) References Cited

U.S. PATENT DOCUMENTS

| | | | | |
|---|---|---|---|---|
| 4,420,185 A | * | 12/1983 | Bienert et al. | 296/223 |
| 4,634,945 A | * | 1/1987 | Takemura et al. | 318/469 |
| 4,893,870 A | * | 1/1990 | Moriya et al. | 296/223 |
| 4,918,360 A | * | 4/1990 | Tanaka et al. | 318/41 |
| 4,983,896 A | * | 1/1991 | Sugiyama et al. | 318/286 |
| 5,169,206 A | * | 12/1992 | Omoto et al. | 307/10.1 |
| 5,184,050 A | * | 2/1993 | Harada et al. | 318/467 |
| 5,280,754 A | * | 1/1994 | Flanagan et al. | 105/341 |
| 5,363,025 A | * | 11/1994 | Colling | 318/468 |
| 5,566,593 A | * | 10/1996 | Vordermaier | 74/625 |
| 5,612,600 A | * | 3/1997 | Bratkowski et al. | 200/61.71 |
| 5,717,300 A | * | 2/1998 | Baloche et al. | 318/282 |
| 5,808,250 A | * | 9/1998 | Torii et al. | 200/19.01 |
| 5,812,052 A | * | 9/1998 | Swanger et al. | 340/433 |
| 5,967,593 A | * | 10/1999 | Schuler et al. | 296/136 |
| 6,010,178 A | * | 1/2000 | Hahn et al. | 296/107.08 |
| 6,028,370 A | * | 2/2000 | Lamm et al. | 307/10.1 |
| 6,030,023 A | * | 2/2000 | Guillez | 296/136 |
| 6,032,415 A | * | 3/2000 | Tajima | 49/26 |
| 6,097,299 A | * | 8/2000 | Yamamura | 340/686.1 |
| 6,111,326 A | * | 8/2000 | Miyata et al. | 307/10.1 |
| 6,114,821 A | * | 9/2000 | Kachouh | 318/466 |

FOREIGN PATENT DOCUMENTS

| | | |
|---|---|---|
| JP | 3-32489 | 5/1991 |
| JP | 6-58029 | 8/1994 |

* cited by examiner

Primary Examiner—Gregory J. Toatley, Jr.
(74) Attorney, Agent, or Firm—Burns, Doane, Swecker & Mathis, L.L.P.

(57) ABSTRACT

A position detection device enables an accurate detection of a position of a moving object. Two cam surfaces are formed on an outer peripheral surface of a rotary body (22) and micros-witches (38, 39) are brought into contact with respective cam surfaces and a logic (L, H) can be established based on signals from two switches.

15 Claims, 6 Drawing Sheets

POSITION DETECTION DEVICE

BACKGROUND OF THE INVENTION

The present invention relates to a position detection device for detecting the position of a body which continuously moves, and more particularly to a device which is suitable for detecting the position of a movable body such as a sunroof or a package tray, a roof panel, back panel, luggage panel or the like which is mounted on a convertible vehicle.

It is a known technique to detect that one movable object has reached a given position using a combination of first and second micro-switches. Examples of such a technique are disclosed in Japanese Patent Publication No. 32489/1991 and Japanese Patent Publication No. 58029/1994.

These examples disclose a technique in which, in performing the closing operation of a sunroof panel, the sunroof panel is once stopped at a position just before a fully closed position so that the catching of a human body can be prevented. By changing over either the first switch or the second switch from an ON state to an OFF state or from the OFF state to the ON state, a judgement circuit detects that the sunroof panel has reached the position just before or right in front of fully closed position in response to signals from the first and second switches.

In the above-mentioned conventional examples, when either one of the first switch or the second switch breaks down, even when the sunroof panel has reached the position right in front of the fully closed position, there is a possibility that the signals from the first or second switch at this point of time become identical with signals obtained at other positions. In this case, it becomes difficult even to recognize that the sunroof panel has reached the position right in front of the fully closed position which is to be detected.

Of course, it may be possible to further add auxiliary switches to the first and second switches. In this case, when one of the first and second switches breaks down, the auxiliary switch may substitute for the broken first or second switch with a signal fed from the auxiliary switch. However, such a provision not only increases switches but also makes the judgement circuit complicated and hence, the provision is disadvantageous in terms of cost.

Accordingly, it is an object of the present invention to provide a position detection device which can overcome the above-mentioned drawbacks of the conventional examples.

SUMMARY OF THE INVENTION

According to the position detection device of the present invention, substantially, two switches, that is, first and second switches are simultaneously changed over and when only one of them is changed over, it is judged that a trouble has occurred. To be more specific, the position detection device of the present invention is provided with first and second switches which perform ON-OFF operations or output ON-OFF signals when an object which continuously moves reaches a given position. The position detection device detects the given position of the object in response to signals from the first and second switches when the first and second switches perform the ON-OFF operations.

Preferably, the position detection device of the present invention is further provided with switch changeover means which acts on the object such that the second switch performs the ON-OFF operation when the first switch performs the ON-OFF operation. To be more specific, the switch changeover means prevents the moving object from stopping in ON-OFF operation range (changeover range) of the first switch and the second switch or moves the object 1 when the object stops in the changeover range of the first switch and the second switch.

BRIEF DESCRIPTION OF THE DRAWINGS

FIG. 4(a) to FIG. 4(e) are explanatory views showing the movements of a roof panel and the like.

DETAILED DESCRIPTION OF THE PREFERRED EMBODIMENTS

As mentioned above, the position detection device is provided with first and second switches which perform ON-OFF operations or output ON-OFF signals when an object which continuously moves reaches a given position. The position detection device detects the given position of the object in response to signals from the first and second switches when the first and second switches perform the ON-OFF operations.

The position detection device is preferably further provided with switch changeover means which acts on the object such that the second switch performs the ON-OFF operation when the first switch performs the ON-OFF operation. To be more specific, the switch changeover means prevents the moving object from stopping in ON-OFF operation range (changeover range) of the first switch and the second switch or moves the object 1 when the object stops in the changeover range of the first switch and the second switch. These examples are shown in FIG. 1 to FIG. 3.

Figure 1:
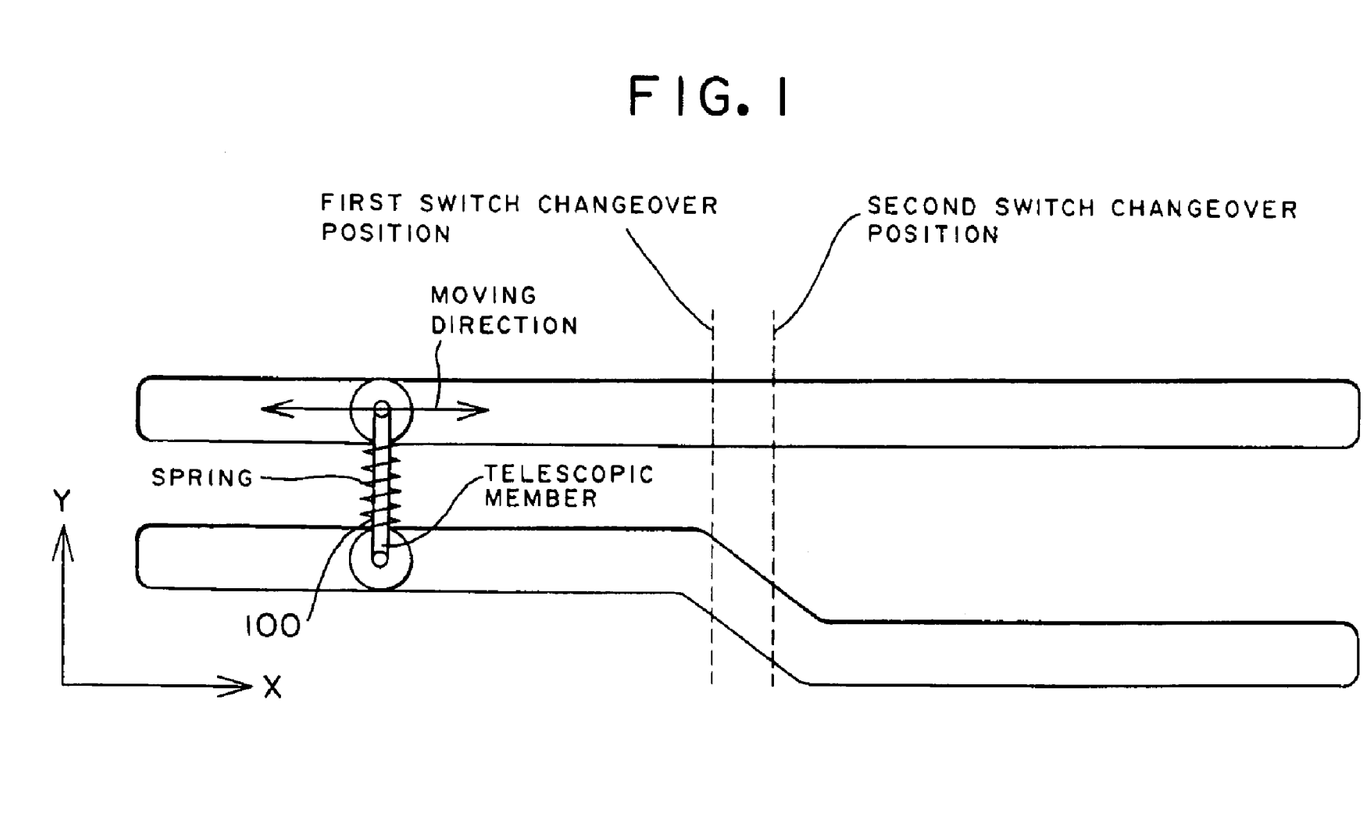
FIG. 1 is an explanatory view showing the principle adopted by a position detection device of the present invention.

In FIG. 1, a gradient is formed in a moving path of an object 100 and ON-OFF operation points (changeover points) of the first switch and second switch are provided to this gradient region. With the provision of such a gradient, it becomes possible to prevent the object 100 from stopping before the first and second switches perform their ON-OFF operations so that signals (changeover signals) generated when the first switch and the second switch perform their ON-OFF operations can be surely obtained.

Figure 2:
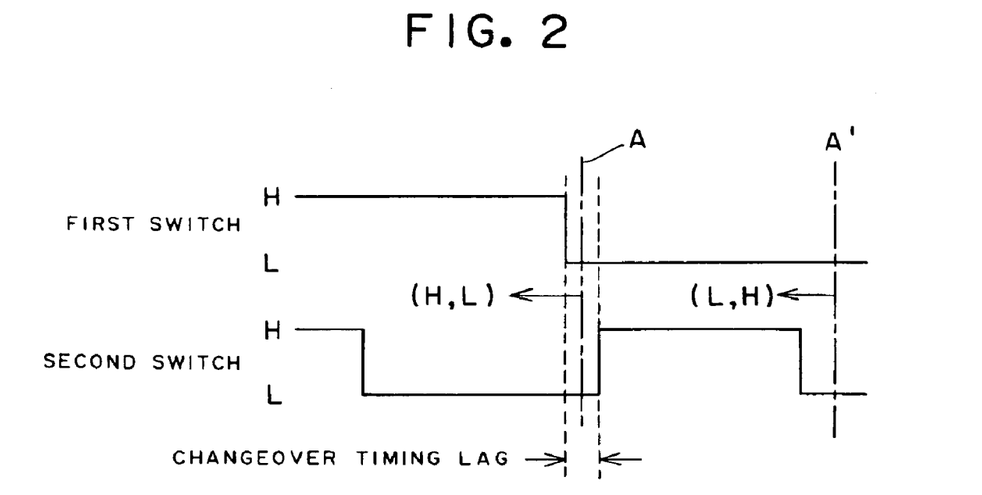
FIG. 2 is a timing chart showing the judgement when a logic (L, L) is established.
Figure 3:
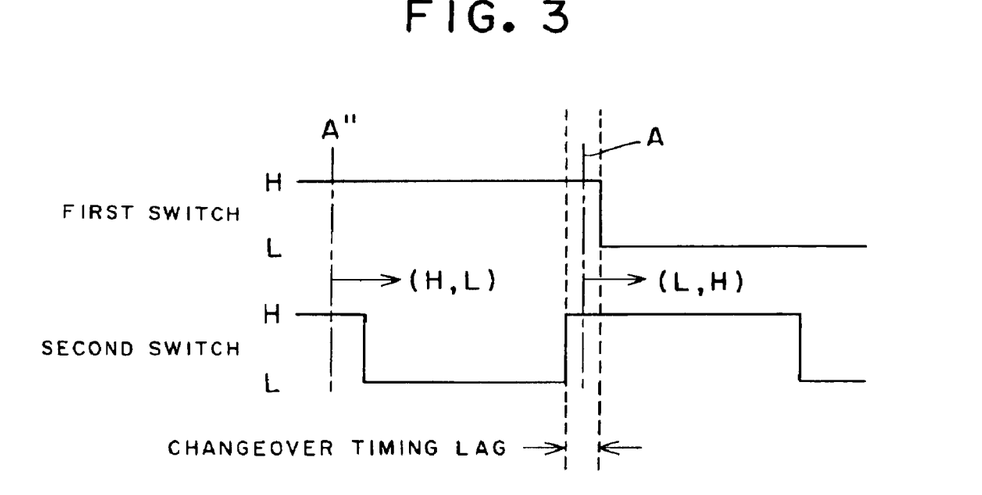
FIG. 3 is a timing chart showing the judgement when a logic (H, H) is established.

In FIG. 2 and FIG. 3, when the object 100 is stopped within the changeover ranges of the first switch and the second switch, by slightly moving the object 100, signals (changeover signals) generated when the first switch and the second switch perform their ON-OFF operations can be surely obtained. In the example shown in FIG. 2, when the object 100 is stopped within the changeover ranges of the first switch and the second switch, it is impossible to judge a given position A and a position A' other than the given position A. Accordingly, by slightly moving the object 100 in an arrow direction by power (or a spring), whether the object 100 is positioned at the position A or the position A' can be judged. That is, if the signals of the first switch and the second switch are (L, L), the object 100 is moved to the left. Here, if (H, L) (for example, refer to high surface and low surface of FIG. 7) is confirmed, it is judged that the object 100 is positioned at the position A, while if (L, H) is confirmed, it is judged that the object 100 is positioned at the position A'.

In the example shown in FIG. 3, when the object 100 is stopped within the changeover ranges of the first switch and the second switch, it is impossible to judge the given position A and a position A" other than the given position A. Accordingly, by slightly moving the object 100 in an arrow direction in the same manner as the case of FIG. 2, whether the object 100 is positioned at the position A or the position A" can be judged. That is, if the signals of the first switch and the second switch are (H, H), the object 100 is moved to the right. Here, if (L, H) is confirmed, it is judged that the object 100 is positioned at the position A while if (H, L) is confirmed, it is judged that the object 100 is positioned at the position A".

Further, when the first switch performs the ONOFF operation, by making the object 100 keep its movement for only a duration that the second switch should perform its ON-OFF operation naturally, the signals (changeover signals) which are generated when the first switch and the second switch perform their ON-OFF operations can be surely obtained.

The above-mentioned basic constitution of the present invention is applicable to the detection of the fully closed position of a sunroof. That is, the A position in FIG. 2 and FIG. 3 is set as a fully closed position, the A' position is set as a fully opened position, and the A" position is set as a tilt-up position of the sun roof. By driving a drive source in a fixed direction, the sunroof is changed over in order of fully opened ←→ fully closed ←→ tilt-up. Here, although the fully closed position becomes an important position for assuring the sealing of an indoor space, the sunroof at the A position (fully closed) can be confirmed with the small movement of the sunroof in the left or right direction.

Further, the present invention is applicable to the detection of the temporary stop position of a sunroof. In a sunroof mounted on a vehicle, it has been well known that the processing such as a temporary stop is performed at a position (intermediate position) which is disposed a fixed distance away from a fully closed position to prevent catching. This intermediate position is an important position for the prevention of catching.

In this case, by setting the fully opened position, the fully closed position and the temporary stop position respectively at the A' position, the A" position and the A position in FIG. 2 and FIG. 3, the important temporary stop position can be surely judged. In addition, based on the determination of a logic of two switches, that is, the first and second switches, the detection of a switch abnormality at the temporary stop position can be performed easily.

The present invention is also applicable to moving objects of a convertible vehicle. With respect to the moving objects of the convertible vehicle, the erecting operation of a package tray and the opening-closing operation of a luggage panel must be performed while confirming their positions to prevent the interference of these moving bodies and a roof panel. In FIG. 2 and FIG. 3, the A" position can be used for detecting a fully closed position of the package tray(the roof panel closed), the A position can be used for detecting a fully opened position of the package tray and the A' position can be used for detecting the fully closed position of the package tray(the roof panel opened). The fully opened position of the package tray must be judged accurately to prevent the interference between the package tray and the roof panel. The present invention is also applicable to this case. Further, the switch abnormality at the fully opened position of the package tray can be easily detected.

A preferred embodiment of the present invention is explained in view of a case that the present invention is applied to a package tray which constitutes a moving object of a convertible vehicle.

The embodiment of the present invention is directed to the convertible vehicle such as an open car which is capable of storing a roof panel (a roof portion) and a rear window (a rear window portion) in a luggage space (a trunk space). In this type of vehicle, as shown in FIG. 4, the movements of the roof panel 1, the rear window 2, a package tray 3 and a luggage panel 4 are ensured.

Figure 4A:
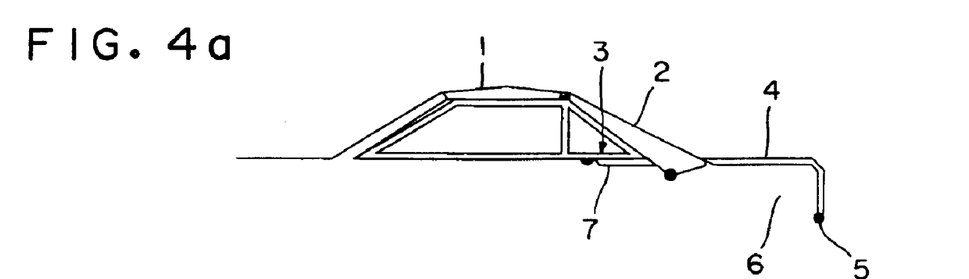
Figure 4B:
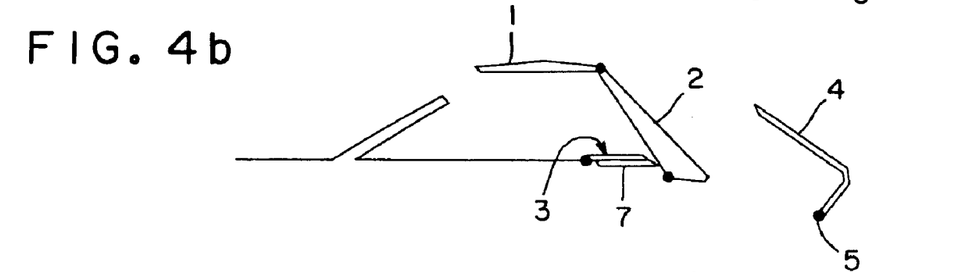

FIG. 4(a) shows a state in which the roof panel 1 and the rear window 2 are held at a closed position. To bring this closed position into a state shown in FIG. 4(e) which indicates an opened position, first of all, the rear window 2 is erected and is turned down in the rearward direction so as to move the roof panel 1 connected to the rear window 2 in the rearward direction while maintaining its horizontal posture. Here, the luggage panel 4 is made to open a front portion thereof about a pivot point 5 (see FIG. 4(b)).

Further turning down of the rear window 2 in the rearward direction brings about the interference between the package tray 3 and the roof panel 1 which moves in the rearward direction. Accordingly, as shown in FIG. 4(c), the package tray 3 is erected in the frontward direction (fully opened position of the package tray 3) so as to prevent the interference between the roof panel 1 and the package tray 3.

Figure 4C:
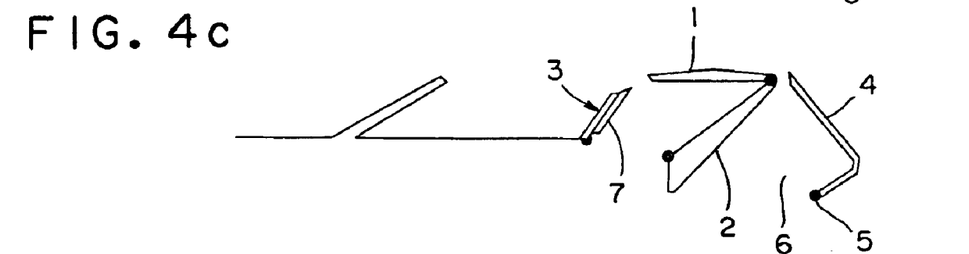
Figure 4D:
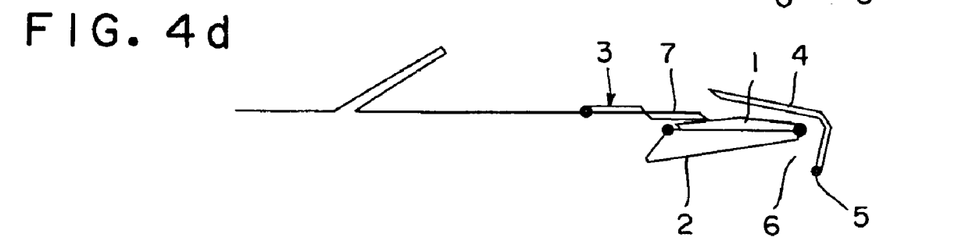

After confirming that the roof panel 1 and the rear window 2 are completely stored in a luggage space 6 in the state shown in FIG. 4(c), a slideboard 7 of the package tray 3 is pulled out in the rearward direction toward the main board and the package tray 3 is turned down in the rearward direction (a fully closed position of the package tray 3) (see FIG. 4(d)).

Figure 4E:
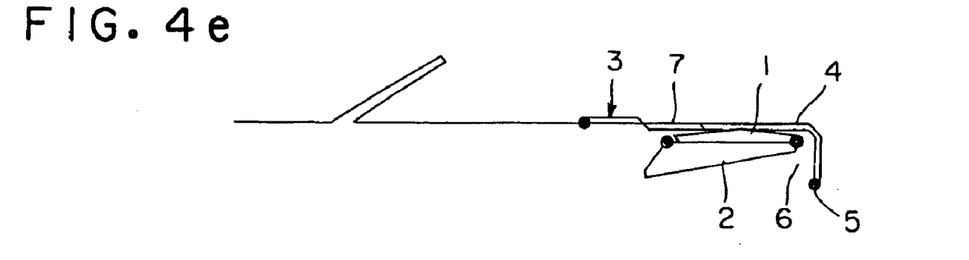

After confirming the fully closed position of the package tray 3 (roof panel opened), the luggage panel 4 is fully closed (see FIG. 4(e)).

To bring the open state, that is, the fully opened state shown in FIG. 4 (e) into the fully closed state shown in FIG. 4(a), the above-mentioned operation is performed in a reverse manner.

In the roof fully closed state shown in FIG. 4(a), to put a luggage into the inside of the luggage space 6, a lock between the luggage panel 4 and a vehicle body is released. Then a rear portion of the luggage panel 4 is lifted so as to open the luggage panel 4 in the rearward direction.

Figure 5:
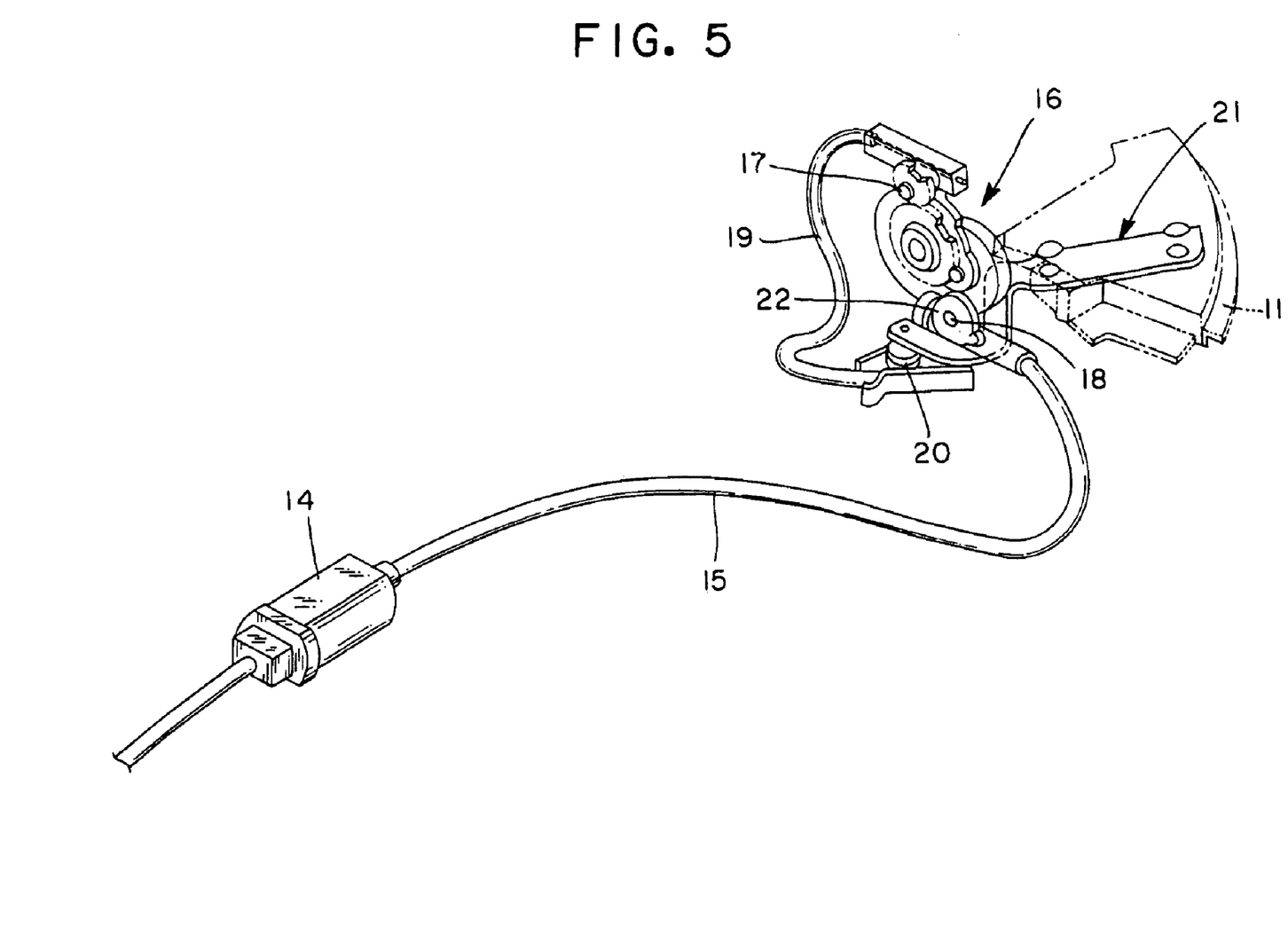
FIG. 5 is a perspective view of a gear box for driving a package tray.

As shown in FIG. 5, an output of a motor 14 is transmitted to a gear box 16 by way of a first geared cable 15. The gear box 16 is made of a conventional combination of a worm, a worm wheel, a spur gear and the like. A first output shaft 17 and a second output shaft 18 respectively generate intermittent outputs at necessary intervals. The first output shaft 17 is connected to a drive gear 20 by way of a second geared cable 19 such that the rotary torque of the first output shaft 17 is transmitted to the drive gear 20.

The drive gear 20 is fixedly secured to a swing arm 21. The swing arm 21 is comprised of a horizontal portion which supports a side board 11 and a stepped portion which extends downwardly from the horizontal portion and is fixedly secured to the drive gear 20.

To give a necessary movement to the side board 11, the first output shaft 17 transmits an intermittent output to the drive gear 20 so as to move the side board 11 back and forth in the indoor direction and in the outdoor direction of the vehicle.

Then, a mechanism provided for generating the movements of a main board 9 and a slide board 10 is explained.

Figure 6:
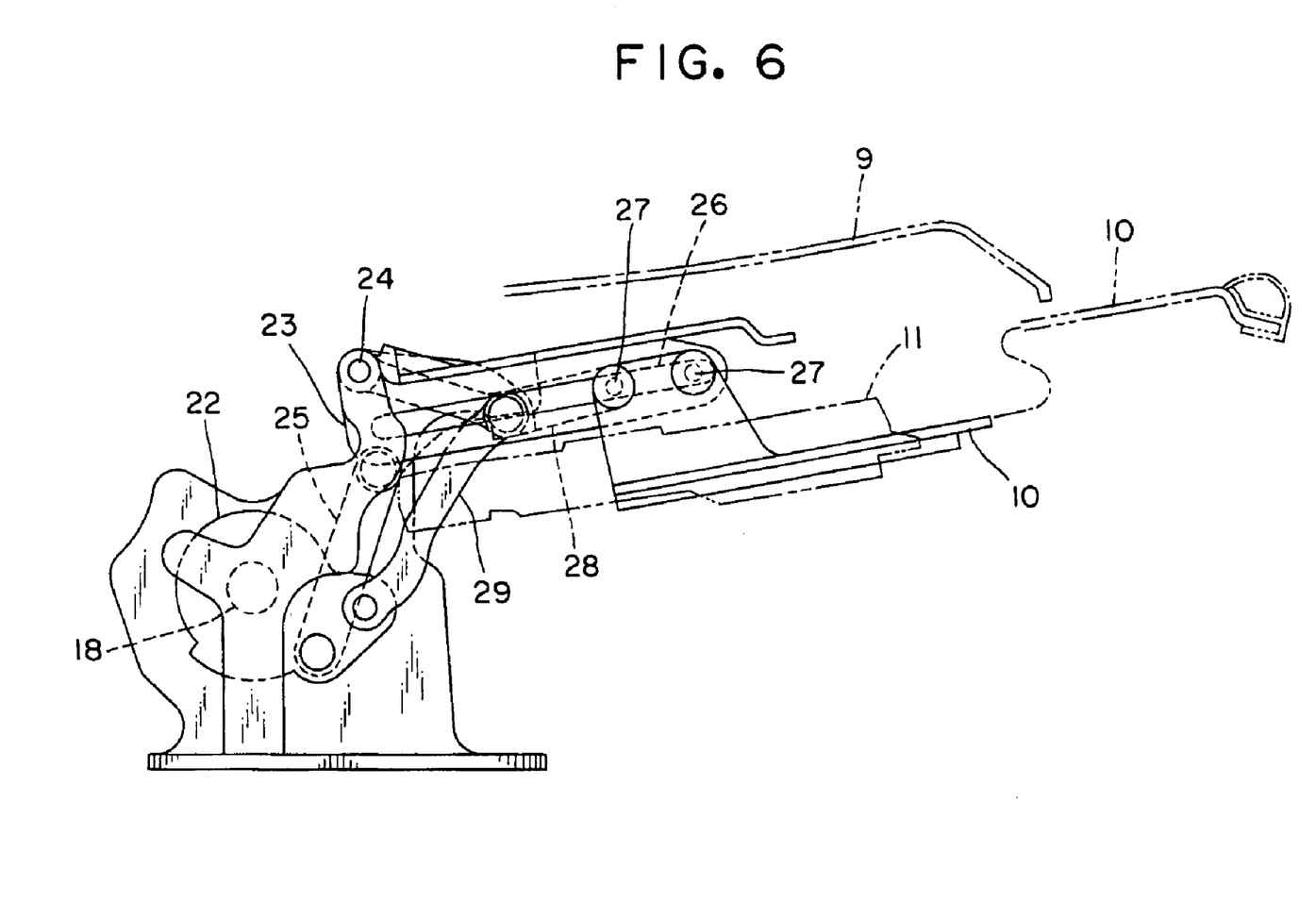
FIG. 6 is a side view of a link mechanism for driving the package tray.

As shown in FIG. 6, a rotary plate 22 is fixedly secured to the second output shaft 18. A bracket 23 is pivotally supported on a stationary member at a vehicle body side by means of a pin 24.

The rotary plate 22 and the bracket 23 are connected with each other by means of a first link 25. A main board 9 is held by this bracket 23.

The bracket 23 is provided with an elongated hole 26 which extends in the longitudinal direction of the bracket 23. A pair of spaced-apart pins 27, 27 are inserted into the elongated hole 26 and the slide board 10 is supported by means of these pins 27, 27. That is, the slide board 10 is slidable relative to the main board 9 by a stroke of the pins 27, 27 which move in the elongated hole 26.

A second link 28 is extended from one pin 27 and this second link 28 is connected to a third link 29 which has one end thereof pivotally connected to the rotary plate 22. The first link 25 and the third link 29 which is longer than the first link 25 are respectively disposed on front and rear sides of the rotary plate 22 and they can cross each other.

FIG. 6 shows the position of the package tray (corresponding to FIG. 4(e)) in the open-car state in which the roof panel is fully opened. Here, the slide board 10 is extended rearwardly from the main board 9 and the side board 11 is in the state shown in FIG. 6.

Figure 7:
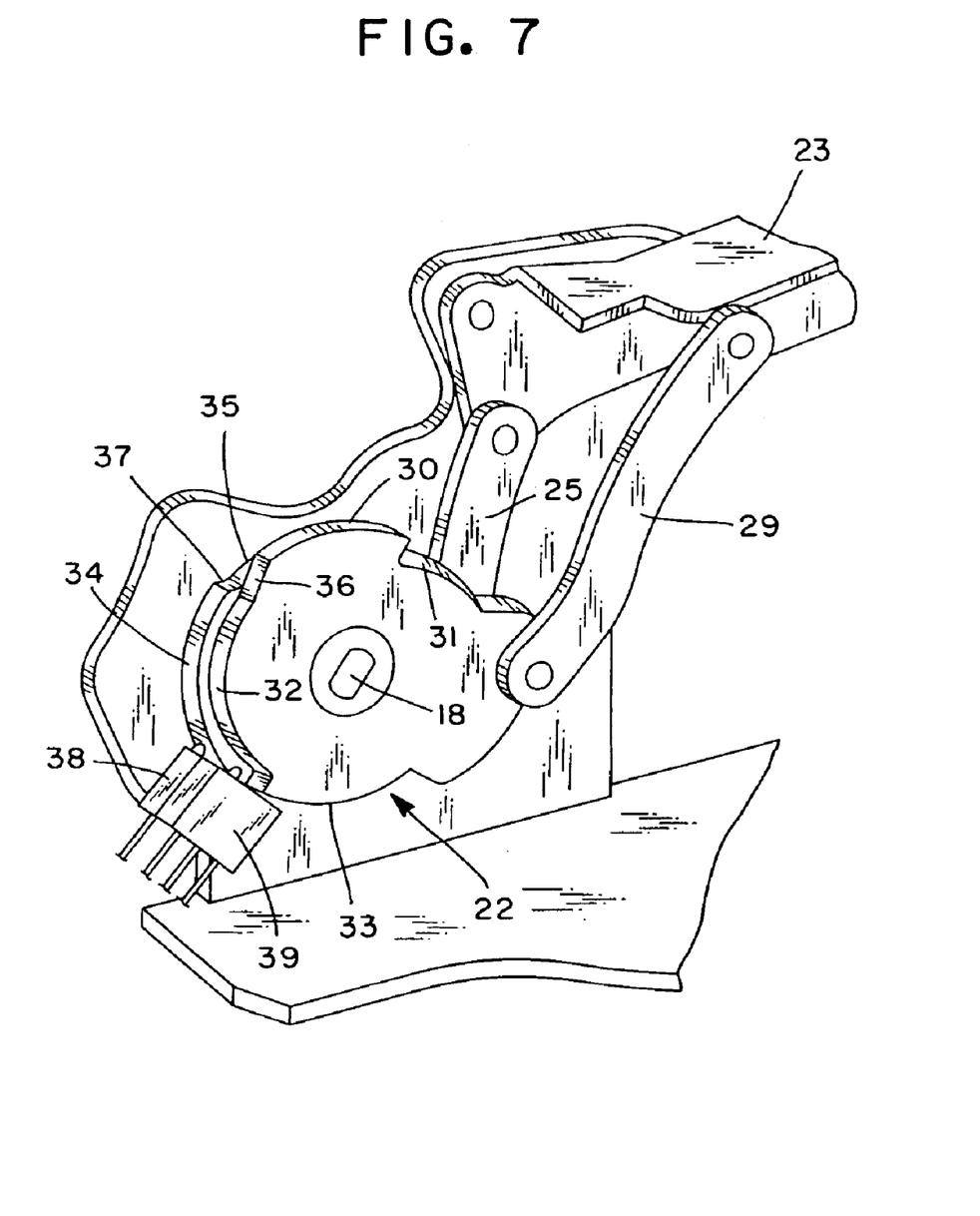
FIG. 7 is a perspective view of a rotary plate and switches.

As shown in FIG. 7, a pair of cam surfaces are formed on an outer peripheral surfaces of the rotary plate 22. One cam surface is comprised of a high surface 30, low surfaces 31, 32 which are disposed at both sides of the high surface 30 and a high surface 33 which is contiguous with one low surface 32. The other cam surface is comprised of a high surface 34 adjacent to the low surface 32 of one cam surface and a low surface 35 adjacent to the high surface 30 of one cam surface. A stepped portion 36 defined between the low surface 32 and the high surface 30 of one cam surface and a stepped portion 37 defined between the high surface 34 and the low surface 35 of the other cam surface are arranged at the approximately same position in the circumferential direction.

First and second micro-switches 38, 39 are arranged along respective cam surfaces such that their contacts are brought into contact with the cam surfaces. The reciprocating movement of the rotary shaft 22 within a given angle enables both switches 38, 39 to establish the logic of FIG. 2 so that the position of the package tray 3 can be detected. In FIG. 2, the A position corresponds to the fully opened position of the package tray 3 and the position A' corresponds to the fully closed position of the package tray 3. By bringing the contacts of the first and second switches 38, 39 into contact with the stepped portions 36, 37, the first switch 38 is changed over from H (ON) to L (OFF) and the second switch 39 is changed over from L (OFF) to H (ON). Accordingly, the fully opened position of the package tray 3 can be surely detected based on the changeover signals fed from the first and second switches 38, 39.

As many apparently widely different embodiments of the present invention can be made without departing from the spirit and scope thereof, it is to be understood that the invention is not limited to the specific embodiments thereof except as defined in the appended claims.

What is claimed is:

1. A position detection device comprising first and second switches which perform ON-OFF operations when a continuously moving object reaches a given position and the given position of the object is detected based on signal conditions from the first and second switches, the position detection device determining that the object has reached the given position when both the first and second switches perform ON-OFF operations in a change over range, and the position detection device distinguishing the given position of the object from a different position of the object at which the signal conditions of the first and second switches are the same as at the given position based on a change in the signal condition of at least one of the first and second switches when the object at the given position is moved.

2. The position detection device according to claim 1, further comprising:

a rotary body mounted on a drive mechanism which constitutes a drive source of an operating mechanism for operating a movable body of a vehicle, the rotary body having first and second cam surfaces formed on an outer peripheral surface thereof in parallel, the first switch being brought into contact with the first cam surface and made to perform the ON-OFF operation by the first cam surface, the second switch being brought into contact with the second cam surface and made to perform the ON-OFF operation by the second cam surface, and cam portions formed on the first cam surface and the second cam surface at approximately same positions so as to make the first switch and the second switch perform the ON-OFF operations when the movable body reaches the given position.

3. The position detection device according to claim 2, wherein the first cam surface and the second cam surface each has a high surface and a low surface and a stepped portion between the low surface and the high surface, the low surface of one of the cam surfaces being arranged along the high surface of the other cam surface.

4. The position detection device according to claim 2, wherein the movable body is a package tray mounted on a convertible vehicle.

5. The position detection device according to claim 1, wherein the position detection device further comprises switch changeover means acting on the object such that the second switch performs the ON-OFF operation when the first switch performs the ON-OFF operation.

6. The position detection device according to claim 1, wherein the position detection device is used with a sunroof of a vehicle.

7. A position detection device comprising first and second switches which perform ON-OFF operations during movement of an object with determination of a position of the object being performed using signal conditions of the first and second switches, the position detection device distinguishing a first position of the object from a different second position of the object, with the signal conditions of the first and second switches being the same when the object is at the first position and when the object is at the second position, based on a change in the signal condition of at least one of the first and second switches when the object is moved.

8. The position detection device according to claim 7, further comprising:

a rotary body mounted on a drive mechanism which constitutes a drive source of an operating mechanism for operating a movable body of a vehicle, the rotary body having first and second cam surfaces formed on an outer peripheral surface thereof in parallel, the first switch being brought into contact with the first cam surface and made to perform the ON-OFF operation by the first cam surface, the second switch being brought into contact with the second cam surface and made to perform the ON-OFF operation by the second cam surface, and cam portions formed on the first cam surface and the second cam surface at approximately same positions so as to make the first switch and the second switch perform the ON-OFF operations when the movable body reaches the given position.

9. The position detection device according to claim 8, wherein the first cam surface and the second cam surface each has a high surface and a low surface and a stepped portion between the low surface and the high surface, the low surface of one of the cam surfaces being arranged along the high surface of the other cam surface.

10. The position detection device according to claim 8, wherein the movable body is a package tray mounted on a convertible vehicle.

11. The position detection device according to claim 7, wherein the position detection device further comprises switch changeover means acting on the object such that the second switch performs the ON-OFF operation when the first switch performs the ON-OFF operation.

12. The position detection device according to claim 7, wherein the position detection device is used with a sunroof of a vehicle.

13. A method of detecting that a moving object has reached a given position comprising:

moving an object;

detecting ON-OFF operation of a first switch located in a changeover range as a result of the movement of the object;

detecting ON-OFF operation of a second switch spaced from the first switch and located in the changeover range as a result of movement of the object; and determining that the object has reached a given position within the changeover range only after ON-OFF operation of both the first switch and the second switch within the changeover range.

14. The method according to claim 13, wherein the step of moving an object involves moving a package tray mounted on a convertible vehicle.

15. The method according to claim 13, wherein the step of moving an object involves moving a sunroof of a convertible vehicle.

* * * * *